United States Patent [19]
Andres et al.

[11] Patent Number: 4,462,838
[45] Date of Patent: Jul. 31, 1984

[54] AQUEOUS ADHESIVE COMPOSITION USEFUL FOR LABELING BOTTLES

[75] Inventors: Johannes Andres, Düsseldorf; Rainer Hasenkamp; Heinrich Merkel, both of Erkrath, all of Fed. Rep. of Germany

[73] Assignee: Henkel Kommanditgesellschaft auf Aktien, Fed. Rep. of Germany

[21] Appl. No.: 542,749

[22] Filed: Oct. 17, 1983

Related U.S. Application Data

[62] Division of Ser. No. 440,074, Nov. 8, 1982.

[30] Foreign Application Priority Data

Nov. 23, 1981 [DE] Fed. Rep. of Germany ....... 3146364
Feb. 13, 1982 [DE] Fed. Rep. of Germany ....... 3205210
Feb. 13, 1982 [DE] Fed. Rep. of Germany ....... 3205211

[51] Int. Cl.$^3$ ............................................. C08L 89/00
[52] U.S. Cl. ................................. 106/139; 106/140; 106/141; 106/197 R; 106/213; 524/42; 524/50
[58] Field of Search ............... 106/139, 141, 197, 213; 524/50, 42

[56] References Cited

U.S. PATENT DOCUMENTS

| | | | |
|---|---|---|---|
| 3,049,538 | 8/1962 | Brobst | 536/111 |
| 3,376,148 | 4/1968 | Columbus | 106/139 |
| 3,515,630 | 6/1970 | Columbus et al. | 40/310 |
| 3,655,644 | 4/1972 | Durand | 106/130 |
| 3,692,713 | 9/1972 | Columbus et al. | 524/50 |
| 3,857,803 | 12/1974 | Shenfeld | 40/310 |

FOREIGN PATENT DOCUMENTS

0080141 6/1983 European Pat. Off. ............ 106/210

*Primary Examiner*—Theodore Morris
*Attorney, Agent, or Firm*—Hammond & Littell, Weissenberger & Dippert

[57] ABSTRACT

This invention relates to aqueous adhesive solutions. More particularly, this invention relates to an aqueous adhesive composition for mechanical labeling based upon starch derivatives and having a content of flow-regulating additives and, optionally, other customary additives, which comprises:

(a) at least one hydroxyalkyl ether of oxidized starch with a mean degree of substitution (MS) of $\leq 0.2$, together with
(b) at least one polymer dissolved in the aqueous phase, the polymer being selected from the group consisting of water-soluble cellulose derivatives, water-soluble synthetic polymers, casein, and water-soluble starch derivatives different from component (a).

27 Claims, No Drawings

AQUEOUS ADHESIVE COMPOSITION USEFUL FOR LABELING BOTTLES

This application is a divisional of U.S. patent application Ser. No. 440,074, filed Nov. 8, 1982.

FIELD OF THE INVENTION

This invention relates to aqueous adhesive solutions. More particularly, this invention relates to aqueous adhesive compositions based upon starch derivatives, the preparation of said compositions, and the use of said compositions in applying labels to bottles, especially in applying labels to glass bottles by means of high-speed, automatic machines.

BACKGROUND OF THE INVENTION

It is known to primarily use starch, dextrin, or casein glues for labeling glass containers. Starch glues represent simple adhesive systems and generally yield bonds with a good resistance to condensation. However, mechanical labeling requires the coordination of the criteria of numerous physical properties. Both during the processing stage and, lastly, on the finished labeled product, a number of demands are made on the adhesive. During processing the adhesive must be capable of flowing sufficiently and of having at the same time good adhesive properties, to be able to be processed on machines working with high-speed elements. Despite a sufficiently low viscosity, the wet adhesive should have a high initial adhesion, which prevents undesired displacement of a freshly attached label on a base, such as a bottle. The adhesion of the dried label is then tested by exposure of the labeled bottle to numerous stresses under the additional action of moisture, which the adhesion bond must withstand.

Mechanical labeling generally requires a certain viscosity range of from about 20,000 to 200,000 mPa·s, with ranges up to about 100,000 mPa·s, particularly from about 20,000 to 70,000 mPa·s, being suitable. In order not to exceed these viscosity ranges with starch glues, solids contents of 30% or less are usually used. Due to the resulting high water content, such starch glues do not usually have high initial adhesive power, which is particularly necessary in mechanical labeling on high-speed, automatic machines.

In comparison to starch glues, dextrin glues are generally more concentrated and thus have a higher initial adhesive power, so that they can also be used for labeling on high-speed, automatic machines. However, a disadvantage is their relatively low waterproofness, due to their relatively low molecular weight, so that they become highly brittle after drying and the labels either fall off or can be easily peeled off. They can not usually be used for labeling surface-tempered bottles.

The above-described disadvantages are not found in casein glues, which are frequently used for labeling. In comparison to starch and dextrin glues, the production of casein glues is relatively expensive, due to the cost of the raw material. In addition, casein, an aminal product, is subject to certain fluctuations in its properties, and thus at least partial replacement by other adhesive substances having positively adjustable and reproducible properties—and preferably being more economical than casein—would be desirable.

OBJECTS OF THE INVENTION

It is an object of the invention to provide novel aqueous adhesive compositions of starch derivatives which, because of their unique rheological properties, are useful for labeling glass containers in high-speed machines at a viscosity as high as 100,000 or 200,000 mPa·s.

It is also an object of the invention to provide a method of preparing said aqueous adhesive compositions.

It is a further object of the invention to provide a method for using said aqueous adhesive compositions as partial or total replacements for casein for labeling bottles.

It is a yet further object of the invention to provide an aqueous adhesive composition for mechanical labeling based upon starch derivatives and having a content of flow-regulating additives and, optionally, other conventional additives, which comprises:
  (a) at least one hydroxyalkyl ether of oxidized starch with a mean degree of substitution (MS) of $\leq 0.2$; and
  (b) at least one polymer selected from the group consisting of water-soluble cellulose derivatives, water-soluble synthetic polymers, casein, and water-soluble starch derivatives different from component (a).

These and other objects of the invention will become more apparent in the discussion below.

DETAILED DESCRIPTION OF THE INVENTION

Applicants have developed novel adhesive compositions based upon certain selected starch derivatives as the main adhesive component, which yield aqueous adhesive mixtures in combination with other selected adhesive components, and which are particularly suitable for use in mechanical labeling on high-speed automatic machines. One aspect of the invention is therefore directed to aqueous adhesive compositions for mechanical labeling, particularly of glass wares, based upon starch derivatives and having a content of flow-regulating additives and, optionally, other customary additives, wherein these compositions comprise:
  (a) at least one hydroxyalkyl ether of oxidized starch with a mean degree of substitution (MS) of $\leq 0.2$, together with
  (b) at least one polymer dissolved in the aqueous phase, the polymer being selected from the group consisting of water-soluble cellulose derivatives, water-soluble synthetic polymers, casein, and water-soluble starch derivatives different from component (a).

A substantial feature of the invention is thus the use of a certain starch component as component (a), that is, the use of hydroxyalkyl ethers of oxidized starches as the main adhesive component. Characteristic of these starch ethers is their very low substitution with hydroxyalkyl ether groups, which is preferably at an MS of $<0.1$. It is especially preferred that the MS of the starch ethers of component (a) is in the range of from about 0.01 to 0.1. Useful hydroxyalkyl ether radicals particularly include hydroxyethyl and hydroxypropyl radicals, where oxidized starch substituted with oxypropyl ether radicals can be especially important. The most preferred starch ethers of component (a) have an MS in the range of from about 0.05 to 0.1.

The starch component (a) is preferably further characterized by its viscosity. Those starch ethers (a) which have a viscosity in the range of from about 40 to 200 mPa·s, as determined in aqueous solution in the Drage-rheomat 15° at 65° C. and at 25% by weight solids content, are suitable. Particularly preferred are those starch ethers whose Drage-viscosity is, under the indicated conditions, in the range of from about 50 to 140 mPa·s.

It is possible to use only one selected hydroxyalkyl starch derivative of the above-mentioned type as adhesive component (a). In an important embodiment of the invention, however, several hydroxyalkyl ether derivatives of oxidized starch can be used, so far as the products used yield aqueous solutions of the indicated viscosity ranges in the adaptation of their individual properties and their quantitative ratios to each other. Thus, it may be particularly expedient according to the invention to use as adhesive component (a) a mixture of hydroxypropyl ethers of oxidized starch with the following characteristics: (1) MS=0.08, Drage-viscosity of about 60 mPa·s at 65° C. and a 25% solids content, as well as (2) MS=0.08, Drage-viscosity of about 130 mPa·s at 65° C. and a 25% by weight solids content. Mixtures of these oxypropylated oxidized starch derivatives in a quantitative ratio of from about 3:1 to 1:3 can be particularly suitable as adhesive component (a).

Aqueous solutions of adhesive components (a) alone are not, however, sufficient to solve the problem of the invention. They are not suitable for processing, particularly on high-speed labeling machines. Usually the viscosity of aqueous solutions of the components (a) with a sufficiently high solids content is far higher than the intended purpose requires. The invention therefore also provides for the additional use of the above-described component (b), which may be one or more compounds selected from the group consisting of water-soluble cellulose derivatives, water-soluble synthetic polymers, casein, and water-soluble starch derivatives which are different from component (a).

Of paramount importance—and also constituting another aspect of the invention—is that a certain type of processing of components (a) and (b) in the production of the adhesive mixtures according to the invention is required to control the adhesive properties of the resulting composition. It is necessary that the above-defined water-soluble polymer component (b) is dissolved in the aqueous phase before adhesive component (a), or substantial portions of adhesive component (a), are dissolved. It has been surprisingly found within the framework of the invention that in this certain order, that is, in the dissolution of component (b) and subsequently component (a) in the aqueous phase, the polymer component (b) gives certain structure-improving effects to the solution of component (a) alone. If the order according to the invention is observed, the aqueous solution of component (b) generally reduces the viscosity and/or improves the flow behavior during the subsequent dissolution of component (a) as compared to aqueous solutions of component (a) without the addition of component (b). The tendency to retrogradation of the hydroxyalkyl ether-substituted components (a), which is relatively low in any event, is further lessened by the addition of component (b). Interestingly enough, addition of component (b) serves at the same time to increase the adhesion. Due to the combined use of components (a) and (b), it is possible to adjust the desired high solids content in the adhesive mixture without limiting the usefulness of the adhesive for mechanical processing on labeling machines.

Component (a), which comprises one or more hydroxyalkyl ether starch derivatives, is present in the finished adhesive in an amount of from about 15 to 50% by weight, preferably from about 25 to 40% by weight, based upon the total weight of the final adhesive composition. On the other hand, adhesive component (b) according to the invention is used in lesser quantities than component (a). Preferably component (b) comprises from about 0.1 to 10% by weight, especially from about 0.5 to 6% by weight, based upon the total weight of the final adhesive composition. In special cases, it may be possible to use larger quantities of component (b), for example, up to 20% by weight or even 25% by weight. Thus, component (b) could comprise from about 0.1 to 25% by weight.

The compounds useful as component (b) can be divided into several subgroups. A first subgroup comprises water-soluble starch derivatives which differ chemically from the starch derivatives used as component (a) in a given composition. Examples of such starch derivatives for component (b) include carboxylalkyl starches, starch derivatives containing cationic groups, with frequently improved water solubility, and/or dextrin. Such starch derivatives can also be reaction products of starch with chloroacetic acid or epoxypropanesulfonic acid, or reaction products with alkylene oxides, such as ethylene oxide or propylene oxide, and it is possible to start from natural or degraded, e.g., oxidized, starch. Certain selected starch ethers or starch ether mixtures are also suitable. When the starch ethers are hydroxyalkyl ethers, they must clearly differ in their chemical structure, and thus in their properties, from the starch hydroxyalkyl ethers used as component (a). Dextrin may comprise commercial thinly-, medium-, or thickly-boiling dextrin, which is obtained in known manner by the decomposition of starch. For example, dextrin can be obtained industrially by thermal degradation of starch (see, *Encyclopedia of Polymer Science and Technology*, Vol. 12 (1970), pages 826–832, incorporated herein by reference). The weight ratio of the hydrocolloids of component (b) to the hydrocolloids of component (a) can be, for example, in the range of from about 1:2 to 1:50, preferably from about 1:2 to 1:15.

Another subgroup of polymer liquefiers useful as component (b) comprises water-soluble synthetic polymers, examples of which include homopolymers or copolymers containing vinyl alcohol and/or vinylpyrididone and/or acrylamide and/or substituted acrylamide. Additional examples include homopolymers or copolymers of acrylic acid or methacrylic acid or water-soluble salts thereof.

More specifically, useful water-soluble synthetic polymers include polyvinyl alcohol with a degree of saponification of from about 70 to 98% and a viscosity value of from about 2 to 100 mPa·s, preferably from about 4 to 18 mPa·s, for a 4% aqueous solution; polyvinylpyrrolidone; copolymers of vinylpyrrolidone wth vinyl acetate or vinyl laurate; polyacrylamide; copolymers of acrylamide with methacrylamide, N-methylolacrylaminde, N-ethyl-acrylamide, N-propylacrylamide, N-butylacrylamide, dimethylamino-ethyl methacrylate, acrylic acid, methacrylic acid, acrylonitrile, methyl acrylate, ethyl acrylate, methyl methacrylate, or mixtures thereof; polyacrylic acid; and copolymers of acrylic acid with acrylonitrile, methyl acrylate, or ethyl acrylate, and alkali metal or ammonium salts thereof, as well as other commercially available water-soluble homopolymers and copolymers.

The weight ratio of the water-soluble synthetic polymers of component (b) to component (a) is generally in the range of from about 1:2 to 1:50, although smaller quantities of the water-soluble synthetic polymers can be used in special cases so that, for example, corresponding weight ratios up to about 1:200 can be used.

A third subgroup of compounds useful as component (b) comprises water-soluble cellulose derivatives, the use of which in aqueous solution causes a predictable, desired improvement in the properties of aqueous solutions of component (a). Useful water-soluble cellulose derivatives preferably include carboxymethylcelluloses, hydroxyalkyl celluloses, and/or mixed ethers of said cellulose derivatives or salts thereof. Examples thereof include carboxymethylcellulose or a water-soluble salt thereof, hydroxyethylcellulose, and/or hydroxypropylcellulose, and mixed ethers of cellulose such as methyl-hydroxyethylcellulose, methyl-hydroxypropylcellulose, and/or carboxymethyl-methylcellulose, or a water-soluble salt thereof, and mixtures of two or more of said derivatives.

The cellulose derivatives of component (b) can be cellulose ethers with degrees of substitution (MS) in the range of from about 0.1 to 3. Preferred are those cellulose derivatives whose viscosity (of a 2% by weight solution at room temperature) is from about 200 to 5000 mPa·s and which have a flocculation point above 60° C., preferably above 80° C.

For the cellulose derivatives of the third subgroup, the weight ratio of component (b) to component (a) is usually in the range of from about 1:50 to 1:500, preferably from about 1:50 to 1:200.

Component (b) may also comprise casein, such as commercially available casein. This usually involves a natural product obtained from milk of mammals (cows or the like) by acid precipitation or enzymatic coagulation, which is separated from accompanying substances to a more or less high degree. Its use as an adhesive in the form of aqueous solutions has long been known (see, *Encyclopedia of Polymer Science and Technology*, Vol. 2 (1965), pages 859–867, incorporated herein by reference). Compared to known casein adhesives, the adhesive mixtures according to the invention are characterized, however, by relatively much lower content of casein. The weight ratio of casein as component (b) to the main adhesive component (a) is in the range of from about 1:2 to 1:15. Furthermore, the absolute content of casein in the adhesive composition is preferably in the range of from about 0.1 to 10% by weight, particularly from about 1 to 10% by weight, and more preferably in the range of from about 0.5 to 6% by weight, based upon the total weight of the final adhesive composition.

In an advantageous embodiment of the invention, the fact that flow characteristics of aqueous starch adhesives can be regulated to a great extent by the addition of certain water-soluble, low molecular weight liquefiers is employed. The addition of urea, thiourea, and/or dicyanamide to starch adhesives is particularly known; moreover, the addition of inorganic or organic salts thereof, such as halides, nitrates, sulfates, acetates, citrates, or tartrates, has a viscosity-regulating effect. See, for example, "Fette, Seifen, Anstrichmittel", 1965, p. 845–847, H. Hardert "Veränderung der Fliessfähigkeit von Klebelösungen and klebtoffhaltigen Bindemitteln", as well as to "Handbuch der Stärke", V-1, R. Köhler, Stärkeklebstoffe, publ. by Paul Parey, 1971, p. 35–37. It is known that the addition of these low molecular weight liquefiers to starch adhesives has a viscosity-reducing effect and can also have a favorable effect on other rheological properties. At the same time, the undesired tendency to retrogradation of the starch adhesive is also reduced.

Actually, adhesive compositions according to the invention which contain both components (a) and (b), as well as the above-described, well-known, low molecular weight liquefiers are highly fluid, even with high solids contents of up to about 60% by weight. The tendency to retrogradation of the starch derivatives is greatly suppressed, and the viscosity is relatively low and can be set to certain predetermined values. At the same time, however, the adhesion of these compositions is still high. Thus, there is an optimum combination of properties for application of the invention.

The known low molecular weight means for regulating flow characteristics, particularly corresponding amorphous salts, urea, thiourea, and/or dicyanamide, are used in amounts of from about 2 to 20% by weight, preferably from about 5 to 12% by weight, based upon the total weight of the final adhesive composition. These low molecular weight liquefiers should be at least partly dissolved in the aqueous phase before the main adhesion components (a) dissolve or are dissolved.

The adhesive composition of the invention can also comprise additional conventional additives useful in adhesive compositions, such as wetting agents (conventional tensides), preservatives, fillers, anti-foaming agents, or the like. In particular, natural starches or starch derivatives different from those previously described may be used. Such additives may be present in amounts of from about 0.3 to 20% by weight, based upon the total weight of the final adhesive composition.

The total solids content of the adhesive compositions according to the invention is preferably in the range of from about 30 to 60% by weight, more preferably from about 40 to 60% by weight. The viscosity of the finished adhesives or glues is normally in the range of from about 20,000 to 200,000 mPa·s, particularly in the range of from about 20,000 to 100,000 mPa·s, as measured at 25° C. according to Brookfield.

In the production method according to the invention for the new adhesive mixtures, the aforementioned additives can be added either in the first step (preliminary solution) or in the second step (solution of component (a)). It is important to proceed only according to the indicated two-step solution methodology to arrive at a sufficiently adhesive glue which has an acceptable viscosity for mechanical labeling. If all components of the glue are dissolved simultaneously in a one-step method, the resulting products will be much higher in viscosity, be nonhomogeneous, and/or have poor rheological properties which are not suitable for mechanical labeling.

The invention also includes a modified one-step method where different hydrocolloids are used with components (a) and (b) according to the invention, one of which—namely, the hydrocolloid of component (b)—dissolves faster. In special cases it may also be possible to use mixtures of components (a) and (b) for the production of the adhesive mixture according to the invention, provided component (b) dissolves much faster and thus yields a sort of preliminary solution, in which the hydrocolloid used as component (a) is subsequently dissolved or swelled.

It is known that the rate of dissolution of water-soluble starch derivatives can be influenced by slight surface cross-linking, which cross-linking is effected primarily to avoid lumps when the material is introduced into water. The rate of dissolution of component (a) can be reduced so far that a simultaneously introduced water-soluble polymer material of component (b) has dissolved practically completely, before a starch derivative of component (a) is dissolved after initial swelling.

Within the scope of the invention it may be advisable to dissolve any additional starch derivatives or natural starch, or only slightly degraded starch, by heating the adhesive mixture to temperatures of from about 70° to 90° C. The result is an adhesive mixture which shows a very favorable rheological behavior, in addition to good stability.

Since the adhesives obtained according to the invention have a high initial adhesive power, particularly in the wet state, they have the potential of improving the initial adhesive power of known adhesive compositions, which improvement can otherwise only be achieved with adhesives based upon casein alone. The methods according to the invention substantially or completely eliminate the use of casein and yet maintain the characteristic properties of the conventional casein labeling adhesives.

In the examples are used the term DS (degree of substitution) which defines the number of substituted ring sites and the term MS (molar substitution) is used in the case of alkylenoxides, which generate a new OH for every glucose-OH reacting (see, Kirk-Othmer, Encyclopedia of Chemical Technology, Third Edition, Vol. 5 (1979) pages 144/5).

The following examples are intended to illustrate the invention and should not be construed as limiting the invention thereto.

EXAMPLES

The adhesive compositions described below were each prepared in a 1 liter beaker which can be heated or cooled by means of a waterbath and which is equipped with an agitator. The water used in the examples had a hardness of 16° dH.

EXAMPLE 1

Fifty grams of urea and 60 gm of a cationic starch ether (reaction product of starch with 3-chloro-2-hydroxypropyl-trimethyl ammonium chloride; DS=0.03), as well as 1 gm of a commercial anti-foaming agent (based upon silicone oil) were distributed under constant stirring in 100 gm of water and dissolved by slow heating to 60° C. After the mass was homogeneous, and after cooling, the water evaporated was replaced, and then an additional 100 gm of water were added.

Subsequent to the addition of 140 gm of hydroxypropyl ether of oxidized potato starch (MS=0.08; viscosity of a 20% by weight solution=30 mPa·s at 65° C. according to Drage, viscosity of a corresponding 25% by weight solution=58 mPa·s at 65° C.) and 36 gm of corn starch, the mixture was heated to 70° C. After stirring for 15 minutes at this temperature, the mixture was cooled to 40° C. Water to replace the water evaporated was added, and then a solution of 6 gm of ethylene glycol and 0.5 gm of 1,2-benzisothiazolin-3-one was added.

The product thus obtained had a viscosity of 50,000 mPa·s as measured at 30° C. according to Brookfield. This product was suitable for labeling mineral water glass bottles at 6° to 9° C. on a high-speed automatic machine (38,000 bottles per hour). This machine was equipped with a glue pump and a glue heating station. The glue temperature was from about 27° to 28° C. The labels did not slip or peel off.

EXAMPLE 2

Amounts of 39.2 gm of urea and 19.6 gm of casein were distributed in 79 gm of water (16° dH). After the addition of 0.3 gm of 1,2-benzisothiazolin-3-one and 1 gm of anti-foaming agent (based upon fatty alcohols), the mixture was heated in a water-bath under stirring to 80° C. Then, 1.0 gm of borax was added, and the stirring was continued for ten minutes at 80° C. until the casein was completely dissolved.

The mixture was then cooled to 40° C., and the water evaporated was replaced.

In another step, 20 gm of corn starch and 30 gm of a cationic starch ether (see Example 1) and 150 gm of hydroxypropyl ether of oxidized potato starch (see Example 1) were stirred in, after the addition of 100 gm of water. The resulting suspension was then heated to 75° C. under constant stirring by means of a water-bath. After standing at this temperature for ten minutes, the suspension was cooled to 40° C., and 10 gm of saccharose were added. The final adhesive solution was then adjusted by the addition of water to a solids content of 47.5%, which was determined by a refractometer.

The product had a viscosity of 60,000 mPa·s as measured at 25° C. according to Brookfield. Beer bottles (Euro-Form) at about 6° C. were labeled with this adhesive for over four hours on a heavy-duty automatic labeling machine at a rate of 45,000 bottles per hour, both side and front labels being applied. The glue was supplied by means of a pump, and the glue temperature upon leaving the heating station was 29° C. Practically no slipping or later peeling of the labels was observed.

EXAMPLE 3

To a charge of 92.5 gm of water, 54.94 gm of urea, 1.15 gm of borax, as well as 22.96 gm of casein, were added under stirring. In addition, 1.15 gm of an anti-foaming agent based upon fatty alcohols and 0.3 gm of 1,2-benzisothiazolin-3-one were added. After heating to 80° C., the mixture was left standing at this temperature for 20 minutes.

Then the mixture was cooled to 40° C., the water evaporated was replaced (84 gm of water), and 120 gm of corn starch and 115 gm of hydroxypropyl ether of oxidized potato starch (see Example 1) were stirred in. After this mixture had been stirred for 15 minutes at 70° C., an additional 83 gm of water were added.

The adhesive product obtained had a viscosity of 80,000 mPa·s as measured at 25° C. according to Brookfield. It was used for the mechanical labeling of 15° C. wet bottles. The glue had a temperature of 32° C. after leaving the heating station.

COMPARISON EXAMPLE 3A

The same quantities of raw material employed in Example 3 were used, but the corn starch, the urea, the borax, the hydroxypropyl ether of oxidized potato starch, the casein, and the anti-foaming agent, as well as the preservative, were added successively to the charged water under stirring.

After stirring for 30 minutes at 80° C., the mixture was allowed to cool down. The product obtained was viscous-pasty at room temperature and had a viscosity of over 1,000,000 mPa·s as measured at 25° C. according to Brookfield. This product was difficult to use as an adhesive, due to its consistency, and use in a labeling machine was not possible. When the viscosity was adjusted for machine application by dilution with water, the adhesion, i.e., the adhesive power, was insufficient.

EXAMPLE 4

Fifty grams of urea with 100 gm of water were stirred at room temperature into 120 gm of a 50% by weight aqueous solution of a medium-boiling, potato-yellow dextrin (viscosity of the 60% by weight solution=3000 mPa·s as measured at 25° C. according to Brookfield). Subsequently,
59 gm of cationic starch ether (see Example 1),
176 gm of hydroxypropyl ether of oxidized potato starch (see Example 1),
1 gm of anti-foaming agent based upon mineral oil,
0.2 gm of benzisothiazolin-3-one,
106 gm of water, and
12 gm of sugar
were added in the indicated order and dissolved under stirring at 75° C. The result was a glue which had after storage for seven days a viscosity of 150,000 mPa·s as measured at 25° C. according to Brookfield.

Usage tests showed that this glue was particularly suitable for labeling bottles of up to 70° C. on high-speed automatic labeling machines which are not equipped with a glue pump.

COMPARISON EXAMPLE 4A

A mixture was produced by mixing the following ingredients in the indicated order (stirring at 75° C.): 100 gm of water, 50 gm of urea, 59 gm of cationic starch ether (see Example 1), 176 gm of hydroxypropyl ether of oxidized potato starch (see Example 1), 1 gm of anti-foaming agent based upon mineral oil, 0.2 gm of benzisothiazolin-3-one, 106 gm of water, and 12 gm of sugar.

After cooling to 40° C., 120 gm of a 50% by weight aqueous solution of the same medium-boiling, potato-yellow dextrin were added. The resulting product was highly gelled after storage for seven days and had, after vigorous stirring, a viscosity of over 1,500,000 mPa·s as measured at 25° C. according to Brookfield.

Due to its consistency, the product was unsuitable for mechanical labeling.

EXAMPLE 5

Fifty grams of urea and 45 gm of a cationic starch ether (reaction product of starch with 3-chloro-2-hydroxypropyl-trimethyl ammonium chloride; DS=0.03), as well as 1 gm of a commercial anti-foaming agent (based upon silicone oil) were distributed under constant stirring in 100 gm of water and dissolved by slow heating to 60° C. After the mass was homogeneous, and after cooling, the water evaporated was replaced, and then an additional 100 gm of water were added.

The mixture was then heated to 70° C. after the addition of 95 gm of hydroxypropyl ether of oxidized potato starch (MS=0.08; viscosity of a 25% by weight solution=60 mPa·s at 65° C. according to Drage), 45 gm of hydroxypropyl ether of oxidized potato starch (MS=0.08; viscosity of a 25% by weight solution=about 120 mPa·s at 65° C. according to Drage), and 36 gm of corn starch. After stirring for 15 minutes at this temperature, the mixture was cooled to 40° C. Water to replace the water evaporated was added, and then 12 gm of cane sugar and 0.5 gm of 1,2-benzisothiazolin-3-one were added.

The product thus obtained had a viscosity of 65,000 mPa·s as measured at 30° C. according to Brookfield. This product was suitable for labeling cold or warm glass bottles on high-speed automatic machines equipped with glue pumps and glue heating stations.

EXAMPLE 6

The following substances were introduced under stirring in 100 gm of cold water:
30.0 gm of a 40% by weight solution of polyvinyl alcohol (degree of saponification ab. 88 mol.%; viscosity of a 4% by weight solution=4 mPa·s at 20° C. as measured according to DIN 53015);
22.9 gm of corn starch;
6.5 gm of cationic potato starch ether (reaction product with 3-chloro-2-hydroxypropyl-trimethyl ammonium chloride; DS=0.03);
25 gm of urea;
88 gm of hydroxypropyl ether of oxidized potato starch (see Example 1); and
1 gm of an anti-foaming agent based on mineral oil.
After homogenization, the mixture was heated for 15 minutes at 80° C., and after cooling to 50° C., 0.1 gm of 1,2-benzisothiazolin-3-one was added.

The product thus obtained has a viscosity of about 60,000 mPa·s measured according to Brookfield at 25° C. and was suitable for the mechanical labeling of cold or warm bottles on high-speed labeling machines. No phase-separation was found in the product during the observation period of three months.

COMPARISON EXAMPLE 6A

In a modification of the procedure of Example 6, the starch and starch derivatives were dissolved first in the absence of the polyvinyl alcohol. Then, after cooling to 50° C., the polyvinyl alcohol solution was stirred in. The resulting solution, which had a viscosity of 80,000 mPa·s as measured according to Brookfield at 25° C., separated after standing for three days.

EXAMPLE 7

Forty-eight grams of a 16% weight solution of polyacrylamide, 50 gm of urea, 59 gm of cationic potato starch ether (see Example 6), 176 gm of hydroxypropyl ether of oxidized potato starch (see Example 6), and 2 gm of a commercial, silicone-based anti-foaming agent were introduced under stirring into 172 gm of water and heated after homogenization to 80° C. After stirring for ten minutes, the mixture was cooled to 40° C., and 0.3 gm of 1,2-benzisothiazolin-3-one as well as 30 gm of natural potato starch were added.

The resulting product had a viscosity of about 70,000 mPa·s as measured at 25° C. according to Brookfield and was particularly suitable for the high-speed labeling of hot bottles on an automatic labeling machine with a gum pump and a heating system.

COMPARISON EXAMPLE 7A

In a modification of the procedure of Example 7, the starch and starch derivatives were dissolved first in the absence of the polyacrylamide solution. Then, after cooling to 40° C., the polyacrylamide solution was stirred in. The resulting solution, the composition of which was identical to that of the solution in Example 7, had a viscosity of 180,000 mPa·s as measured at 25° C. according to Brookfield and exhibited a long and viscous structure. It was totally unsuitable for use on labeling machines.

EXAMPLE 8

Three grams of methyl-hydroxypropylcellulose (degree of substitution: 19–24% by weight methoxy groups and 4–12% by weight hydroxypropoxy groups; viscosity of a 2% by weight aqueous solution=about 15,000 mPa·s as measured according to Brookfield RTV, 20 rpm) were dissolved under stirring in 153.5 gm of cold water. After the batch was homogeneous, 22.9 gm of corn starch, 6.5 gm of a cationic starch ether (reaction product with 3-chloro-2-hydroxypropyl-trimethyl ammonium chloride; DS=0.03), 25 gm of urea, 88 gm of hydroxypropyl ether of oxidized potato starch (according to Example 1), as well as 1 gm of commercial silicone-based anti-foaming agent were stirred in successively and dispersed homogeneously. After heating to 70° to 80° C., the mixture was stirred for 15 minutes and subsequently cooled to about 40° to 50° C., and then 0.1 gm of 1,2-benzisothiazolin-3-one, as well as water, were added up to bring the net weight of the mixture to 300 gm.

The product thus obtained had a viscosity of about 40,000 mPa·s as measured at 30° C. according to Brookfield. It was suitable for labeling cold or hot bottles on high-speed labeling machines which were each equipped with a glue pump and a heating station.

EXAMPLE 9

Six grams of carboxymethyl-methylcellulose (degree of substitution: 27–29% by weight methoxy groups, 2–5% by weight carboxymethoxy groups; viscosity of the 2% by weight aqueous solution at 20° C.=2000 mPa·s as measured according to Brookfield RTV, 20 rpm), 45.8 gm of corn starch, 13 gm of cationic starch ether (see Example 1), 176 gm of hydroxypropyl ether of oxidized potato starch (see Example 1), as well as 2 gm of a commercial anti-foaming agent based upon mineral oil were introduced under constant stirring into 307 gm of water and stirred until the carboxymethyl-methylcellulose was completely dissolved. The other substances mentioned above remained in suspension. Then, 40 gm of urea and 10 gm of sodium nitrate were added, which were similarly dissolved under stirring.

After heating to 80° C. and stirring for 20 minutes, the mixture was cooled to 40° C. Then, 0.2 gm of 1,2-benzisothiazolin-3-one, as well as water, were added up to bring the net weight of the mixture up to 600 gm.

The resulting product had a viscosity of 80,000 mPa·s as measured at 20° C. according to Brookfield and was characterized by good stability. It was suitable for labeling cold to hot bottles on high-speed machines with a glue pump, but without heating means.

COMPARISON EXAMPLE 9A

The same quantities of raw material employed in Example 9 were used, but first the corn starch, cationic starch ether, hydroxypropyl ether of oxidized potato starch, and anti-foaming agent were introduced into the water. After constant stirring and then subsequent cooling to 50° C., the carboxylmethyl-methylcellulose was stirred in. The resulting mass became progressively more viscous after a few days and was nonhomogeneous within a week.

EXAMPLE 10

Fifty-nine grams of cationic potato statch ether (see Example 1), 30 gm of polyvinylpyrrolidone (molar weight of about 40,000), and 176 gm of hydroxypropyl ether of oxidized potato starch (see Example 1) were dispersed homogeneously under stirring in 190 gm of cold water and stirred until the polyvinylpyrrolidone was dissolved. The other portions were homogeneously dispersed but remained suspended in undissolved form. After the addition of 2 gm of a commercial, mineral oil-based anti-foaming agent, the mixture was heated for 20 minutes to 90° to 95° C. During cooling to about 50° C., 40 gm of urea and 10 gm of sugar, as well as 0.6 gm of 1,2-benzisothiazolin-3-one, were added in portions.

The product thus obtained was adjusted, after cooling to 30° C., by the addition of a 20% urea solution to a refractometric solids content of 46.5% and then had a viscosity of about 35,000 mPa·s as measured according to Brookfield at 20° C. It was particularly suitable for high-speed labeling of moderately cold (15°–20° C.) or warm bottles on automatic machines with glue pumps but without additional heating means.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An aqueous adhesion composition for mechanical labeling based upon starch derivatives and having a content of flow-regulating additives and, optionally, other customary additives, which comprises:
   (a) at least one hydroxyalkyl ether of oxidized starch with a mean degree of substitution (MS) of $\leq 0.2$, together with
   (b) at least one polymer dissolved in the aqueous phase, the polymer being selected from the group consisting of water-soluble synthetic polymers, and casein.

2. The adhesive composition of claim 1, wherein component (a) has an MS of $<0.1$.

3. The adhesive composition of claim 2, wherein component (a) has an MS of from about 0.01 to 0.1.

4. The adhesive composition of claim 1, wherein component (a) has a Drage-viscosity in the range of from about 40 to 200 mPa·s—determined in aqueous solution in the Drage-rheomat 15 at 65° C. and 25% by weight solids content.

5. The adhesive composition of claim 4, wherein component (a) has a Drage-viscosity of from about 50 to 140 mPa·s.

6. The adhesive composition of claim 1, wherein component (a) comprises a mixture of two or more hydroxyalkyl ethers of oxidized starch.

7. The adhesive composition of claim 6, wherein the hydroxyalkyl ethers of oxidized starch have different Drage-viscosities.

8. The adhesive composition of claim 1, wherein component (a) comprises oxypropyl-starch derivatives with an MS of from about 0.05 to 0.1.

9. The adhesive composition of claim 1, wherein component (a) comprises from about 15 to 50% by weight, based upon the total weight of the final adhesive composition.

10. The adhesive composition of claim 9, wherein component (a) comprises from about 25 to 40% by weight, based upon the total weight of the final adhesive composition.

11. The adhesive composition of claim 1, wherein component (b) is present in a smaller amount than component (a).

12. The adhesive composition of claim 11, wherein component (b) is present in an amount of from about 0.1 to 10% by weight, based upon the total weight of the final adhesive composition.

13. The adhesive composition of claim 12, wherein component (b) is present in an amount of from about 0.5 to 6% by weight, based upon the total weight of the final adhesive composition.

14. The adhesive composition of claim 1, wherein component (b) comprises at least one polymer selected from the group consisting of homopolymers and/or copolymers of vinyl alcohol, vinyl pyrrolidone, or substituted acrylamide and/or methacrylic acid and water-soluble salts thereof.

15. The adhesive composition of claim 1 having a further content of from about 2 to 20% by weight, based upon the total weight of the final adhesive composition, of low molecular weight compounds known as low-molecular weight means for regulating adhesive fluidity.

16. The adhesive composition of claim 15, containing from about 5 to 12% by weight, based upon the total weight of the final adhesive composition, of said low molecular weight compounds.

17. The adhesive composition of claim 15, wherein said low molecular weight compounds are selected from the group consisting of urea, thiourea, dicyanamide, and inorganic or organic water-soluble salts.

18. The adhesive composition of claim 1 which comprises conventional additives selected from the group consisting of natural starches, wetting agents, antifoaming agents, and preservatives.

19. The adhesive composition of claim 18, wherein the conventional additives are present in a total amount of from about 0.3 to 20% by weight, based upon the total weight of the final adhesive composition.

20. The adhesive composition of claim 1, wherein the total solids content is from about 30 to 60% by weight and the viscosity according to Brookfield is from about 20,000 to 200,000 mPa·s.

21. The adhesive composition of claim 20, wherein the total solids content is from about 40 to 60% by weight.

22. The adhesive composition of claim 20, wherein the viscosity is from about 20,000 to 100,000 mPa·s.

23. An aqueous adhesion composition of mechanical labeling based upon starch derivatives and having a content of flow-regulating additives and, optionally, other customary additives, which comprises:
(a) from about 15 to 50% by weight, based upon the total weight of the final adhesive composition, of at least one hydroxyalkyl ether of oxidized starch with a mean degree of substitution of from about 0.01 to 0.1 and a Drage-viscosity, as determined in aqueous solution in the Drage-rheomat 15 at 65° C. and 25% by weight solids content, of from about 40 to 200 mPa·s, together with
(b) at least one polymer dissolved in the aqueous phase, the polymer being selected from the group consisting of water-soluble synthetic polymers and casein, the amount of component (b) being smaller than the amount of component (a),
wherein the total solids content is from about 30 to 60% by weight and the viscosity according to Brookfield is from about 20,000 to 200,000 mPa·s.

24. The adhesive composition of claim 23, wherein the total solids content is from about 40 to 60% by weight and the viscosity according to Brookfield is from about 20,000 to 100,000 mPa·s.

25. A method for preparing the adhesive composition of claim 1 which comprises dissolving component (a) in an aqueous solution of component (b).

26. The method of claim 25, wherein the aqueous solution of component (b) comprises low molecular weight means for regulating adhesive fluidity.

27. The method of claim 25, wherein the aqueous solution of component (b) is heated for dissolution of component (a).

* * * * *